Nov. 21, 1950  E. E. HEWITT  2,531,043
INDICATING APPARATUS FOR LOAD COMPENSATING FLUID
PRESSURE BRAKE EQUIPMENT
Filed Feb. 18, 1949
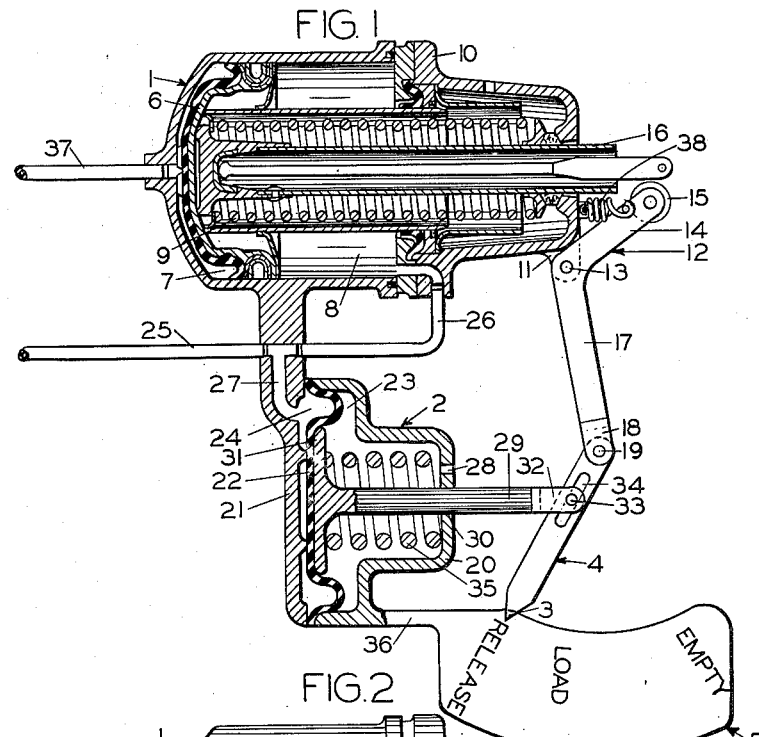
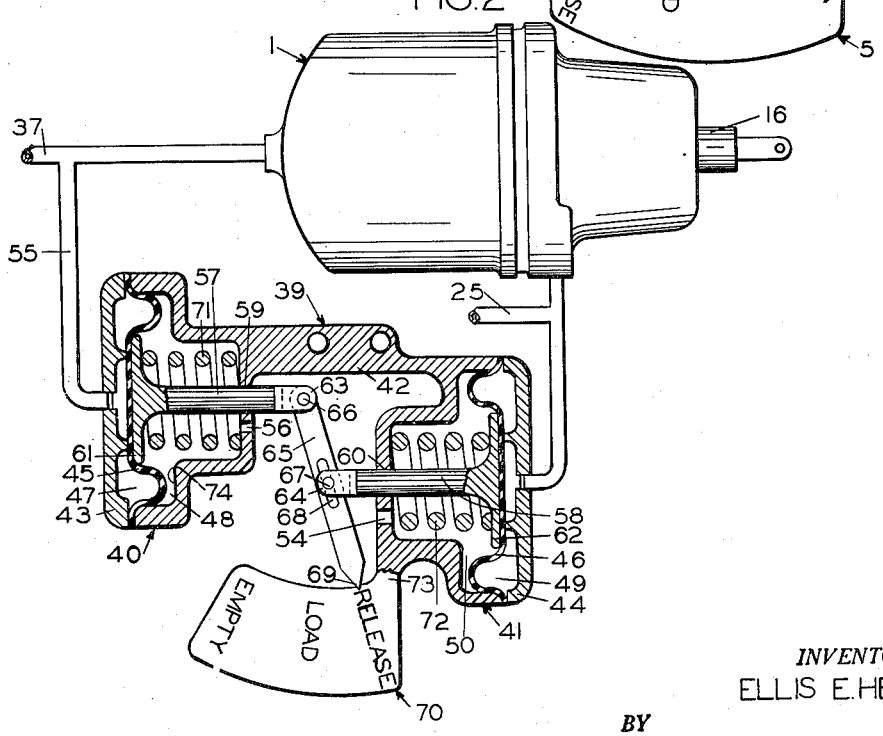
INVENTOR.
ELLIS E. HEWITT
BY
Adelbert A. Steinmiller
ATTORNEY Patented Nov. 21, 1950

2,531,043

UNITED STATES PATENT OFFICE 2,531,043

INDICATING APPARATUS FOR LOAD COMPENSATING FLUID PRESSURE BRAKE EQUIPMENT

Ellis E. Hewitt, Edgewood, Pa., assignor to The Westinghouse Air Brake Company, Wilmerding, Pa., a corporation of Pennsylvania Application February 18, 1949, Serial No. 77,226

7 Claims. (Cl. 303—1)

This invention relates to load compensating fluid pressure brake equipment such as disclosed in the copending application of Earle S. Cook et al., Serial No. 736,010, filed March 20, 1947, now Patent No. 2,482,246, dated Sept. 20, 1949 and assigned to the assignee of the present application, and more particularly to an indicating mechanism for indicating the type of brake operation obtained during a brake application effected by said equipment.

One object of the invention is to provide an improved indicating mechanism for the above use.

Another object of the invention is the provision of an improved indicating mechanism for use with load compensating brake equipment for visually indicating to a person standing beside a freight car whether a brake application effected by said equipment is in accord with the empty or loaded condition of the car.

Another object of the invention is to provide an indicating mechanism such as defined in the last object, which will also visually indicate to a person at the side of the car when no brake operation is in effect.

Other objects and advantages will be apparent from the following more detailed description of the invention.

In the accompanying drawing; Fig. 1 is a diagrammatic, sectional view of a load compensating type of brake cylinder device embodying, in vertical section, one form of the invention; and Fig. 2 is a sectional view of another form of the invention shown associated with a load compensating type of brake cylinder device.

Description of the apparatus shown in Fig. 1

As shown in Fig. 1 of the drawing, reference numeral 1 designates a load compensating type of brake cylinder device and numeral 2 designates a fluid motor which together are arranged to control the movement of a pointed end 3 of an indicating arm 4 along a scale 5, the scale having legends to indicate release, empty or load operation of said brake cylinder device.

The brake cylinder device 1 may be substantially similar to that shown and described in detail in the above mentioned copending application as well as in the copending application of Arthur J. Bent, Serial No. 764,941, filed July 31, 1947, and assigned to the assignee of the present application. For sake of brevity, a detailed description of its structure will not therefore be repeated herein. Briefly, however, the brake cylinder device 1 embodies a piston 6 adapted to be operatively connected to the usual brake rigging (not shown) for applying a braking force to a brake shoe or shoes (not shown) by fluid under pressure acting on one side of said piston in the usual pressure chamber indicated by the reference numeral 7. When a car is less than fully loaded, the fluid under pressure in chamber 7 is adapted to be opposed by fluid in a compensating chamber 8 at the opposite side of piston 6 at a pressure substantially inversely proportional to the degree of load on the car and when fully loaded chamber 8 is adapted to be open to atmosphere, for thereby providing a braking force on a car substantially proportional to the degree of load on the car as fully described in the above mentioned Cook et al. application. The brake cylinder device 1 is further provided with a spring 9 for returning the piston 6 to a brake release position in which it is shown in Fig. 1, when fluid under pressure is vented from chamber 7.

The brake cylinder device 1 further comprises a non-pressure head 10 having a lug 11 to which is pivoted at its knee a bell crank 12 by means of a pin 13. The bell crank 12 carries at the end of one of its arms, designated by numeral 14, a roller 15 which is disposed in the path of movement of a hollow rod 16 operatively connected to the brake cylinder piston 6 in such a manner as to rock said bell crank 12 clockwise about pin 13 when said piston and hollow rod are moved in the direction of the right hand upon the supply of fluid under pressure to the pressure chamber 7. The other arm 17 of the bell crank 12 is operatively connected to the end of lever 4, opposite the pointed end, by means of a clevis 18 formed at the end of said arm, and a pin 19.

The motor 2 comprises a casing section 20 and a cover 21 secured to each other by any suitable means (not shown) and a diaphragm 22 clamped around its edge between said casing section and said cover. The cover 21 is rigidly associated with the body of the brake cylinder device 1. Two chambers 23 and 24 are formed at opposite sides, respectively, of the diaphragm 22. A pipe 25 connected to the compensating pressure chamber 8 in the brake cylinder device 1 by way of another pipe 26 is also connected to chamber 24 through a passageway 27 formed in the cover 21, while the chamber 23 is open to atmosphere through a port 28 in the casing section 20.

A diaphragm follower 29 slidably extending through a bore 30 in the casing section 20 has at one end a follower head 31 disposed in chamber 23 in contact with the diaphragm 22 and at the opposite end of a clevis 32 connected to the indicating arm 4 intermediate its ends by means of a pin 33 disposed in a slot 34 provided in said arm lengthwise thereof. Disposed in the chamber 23 is a spring 35 bearing against the casing section 20 and the follower head 31 for urging said head and diaphragm 22 to the position in which they are shown in Fig. 1 of the drawing. The scale 5 may be rigidly associated with the casing section 20 through the medium of a connecting web or arm 36.

As disclosed in the above mentioned pending application of Cook et al., a pipe 37 connected to the usual pressure chamber 7 is also adapted to be connected to a brake controlling valve device, such as the well-known AB, which is operative to either open the usual brake cylinder pressure chamber 7 to atmosphere for effecting a release of brakes or to supply fluid under pressure to said chamber for effecting an application of brakes, while the pipe 25 is adapted to be connected to a load adjusted relay valve device controlled by pressure of fluid effective in pipe 37 to open the brake cylinder compensating chamber 8 to atmosphere when the chamber 7 is open to atmosphere and to vary the pressure of fluid in chamber 8 inversely in proportion to the load on the car, from atmospheric pressure for a fully loaded car to the same pressure as acting in chamber 7 when the car is empty, upon supply of fluid under pressure to chamber 7.

Operation

In operation, let it be assumed that both pipes 37 and 25 are open to atmosphere, due to which the piston 6 will occupy its brake release position and the diaphragm 22 will also be in the position in which it is shown in the drawing due to action of springs 9 and 35 respectively. With the piston 6 and diaphragm 22 thus positioned, the pointed end 3 of lever 4 will be disposed in front of the scale 5 opposite the legend "Release" indicating that the brakes on the car are released.

Now let it be assumed that fluid under pressure is supplied to chamber 7 of the brake cylinder 1 through the pipe 37 for effecting an application of brakes. The piston 6 will thereby be operated to move the hollow rod 16 in the direction of the right hand against the opposing force of the spring 9. As the right-hand end of the hollow rod 16 moves in the direction of the right hand it will engage the roller 15 and rock bell crank 12 clockwise about the pin 13 until the bottom undersurface of said hollow rod is able to ride over said roller, thereby effecting a change in position of the upper end of arm 4. If the car is fully loaded, the compensating pressure chamber 8 in the brake cylinder device 1 and diaphragm chamber 24 will remain vented in effecting an application of brakes so that the position of fulcrum pin 33 for arm 4 will not change, under which condition the rocking of bell crank 12 by movement of the brake cylinder hollow rod 16 will move the pointed end 3 of said arm to a position in front of the scale 5 opposite the legend "Load", thereby indicating to an observer that a brake application is in effect and that the braking force applied to the brake shoes is that required to brake a fully loaded car.

Now let it be assumed that the car is empty when the brake cylinder piston 6 is displaced by fluid under pressure supplied to chamber 7. The bell crank 12 will be rocked the same as when the car is fully loaded. With the car empty the same pressure of fluid will be provided in the brake cylinder compensating pressure chamber 8 as in the pressure chamber 7, and while this will have no effect upon the position of the brake cylinder piston and the degree of rocking of bell crank 13, said pressure acting in chamber 24 on diaphragm 22 will deflect said diaphragm and move follower 29 to a position in which the pressure of spring 35 is increased sufficiently to stop such movement. This movement of follower 29 will move pin 33 and its connection with the intermediate portion of arm 4 outwardly, which together with the change in position of the upper end of said arm, will bring the pointed end 3 thereof to a position over the legend "Empty" on scale 5 now indicating to an observer of the scale 5 that a brake application is in effect and that the braking force applied to the brake shoes is that required to brake an empty car.

The characteristics of spring 35 may be such as to permit diaphragm 22 to assume positions, between the positions it assumes for a fully loaded car and an empty car, corresponding to the pressure of fluid provided in the brake cylinder compensating chamber 8 and hence in chamber 24, and therefore corresponding to the degree of load on the car, due to which, the pointed end 3 of arm 4 will assume the corresponding position between the legends "Empty" and "Load" to indicate to an observer that the braking force on the car is in accord with the loaded condition thereof.

When fluid under pressure is released from the brake cylinder chamber 7 to effect a release of brakes, the brake cylinder compensating chamber 8 and diaphragm chamber 24 will also be vented, if not already vented. The brake cylinder piston 6 will be returned to its brake release position by spring 9 and spring 38 will return bell crank 12 to its normal position, in which it is shown in the drawing. With the bell crank 12 thus positioned and diaphragm 22 and follower 29 also returned by spring 35 to their normal position, in which they are shown in the drawing, in case they do not already occupy such position, the pointed end 3 of arm 4 will be positioned over the legend "Release" to indicate the condition of the brake apparatus.

It will now be seen that the pointed end 3 of the arm 4 will assume a position with respect to scale 5 corresponding to the operation of the brake apparatus, that is to indicate whether the brakes are released or applied, and if applied to indicate the type of brake application, that is, whether for an empty car, a fully loaded car, or a partially loaded car.

Description of the apparatus shown in Fig. 2

In the embodiment of the invention shown in Fig. 2, an indicating mechanism, designated by the general reference character 39, is adapted to be operated solely by the pressures in the chambers 7 and 8 of the brake cylinder device 1 and therefore independently of the hollow rod 16. Since the details of the brake cylinder device 1 are the same in both embodiments of the invention, the brake cylinder device shown in Fig. 2 is in outline only.

The indicating mechanism 39 comprises two oppositely acting fluid motors 40 and 41. The two fluid motors 40 and 41 may comprise a common casing section 42 and two covers 43 and 44 secured to opposite ends of said casing section by any suitable means (not shown). Two substantially parallel arranged diaphragms 45 and 46, one for each fluid motor, are clamped around their edges between casing section 42 and the covers 43 and 44. Two chambers 47 and 48 are formed at opposite sides, respectively, of the diaphragm 45, while two similar chambers 49 and 50 are formed at opposite sides, respectively, of the diaphragm 46, said chambers 48 and 50 being formed in the casing section 42. The pipe 25 connected to the compensating pressure chamber 8 in the brake cylinder device 1 is also connected to chamber 49, constituting a control chamber, while the chamber 50 is open to atmosphere through a port 54 in the casing section 42. A pipe 55 connected to the brake cylinder pipe 37 is also connected to chamber 47, also constituting a control chamber, while the chamber 48 is open to atmosphere through a port 56 in the casing section 42. The two control chambers 47 and 49 are arranged at the opposite sides of the diaphragm 45, 46, respectively.

Two diaphragm followers 57 and 58 slidably extend through two bores 59 and 60 respectively, in the casing section 42. The followers 57 and 58 have at one end follower heads 61 and 62 disposed in chambers 48 and 50 in engagement with the adjacent sides of diaphragms 45 and 46, respectively. The diaphragm followers 57 and 58 have at their opposite end clevises 63 and 64, respectively. The clevis 63 is connected to an indicating arm 65 at one end thereof by means of a pin 66 while the clevis 64 is connected to said arm intermediate its ends by means of a pin 67 disposed in a slot 68 provided in said arm lengthwise thereof. The indicating arm 65 is provided, at its end opposite that end to which the clevis 63 is connected, with a pointed end 69 which is movable by the fluid motors 40 and 41 along a scale 70 having legends to indicate release, empty or load operation of the brake cylinder device 1.

Disposed in the chambers 48 and 50 are springs 71 and 72, bearing against the casing section 42 and the follower heads 61 and 62, respectively, for urging said heads and diaphragms 45 and 46 to the positions in which they are shown in Fig. 2 of the drawing. The scale 70 may be rigidly associated with the casing section 42 through the medium of a connecting web or arm 73.

Operation

In operation, let it be assumed that both pipes 37 and 25 are open to atmosphere, due to which the piston 6 of the brake cylinder device 1 will occupy its brake release position the same as shown in Fig. 1, and the diaphragms 45 and 46 will also be in the positions in which they are shown in Fig. 2 of the drawing due to action of springs 71 and 72, respectively. With the piston 6 and diaphragms 45 and 46 thus positioned, the pointed end 69 of the indicating arm 65 will be disposed in front of the scale 70 opposite the legend "Release" indicating that the brakes on the car are released.

Now let it be assumed that fluid under pressure is supplied to chamber 7 of the brake cylinder device 1 through the pipe 37 for effecting an application of brakes. If the car is fully loaded the compensating pressure chamber 8 in the brake cylinder device 1 and the diaphragm chamber 49 will remain vented so that the position of fulcrum pin 67 for arm 65 will not change. Fluid at the pressure supplied to the chamber 7 also becomes effective in chamber 47 via the pipe 55 and deflects the diaphragm 45 in the direction of the right hand until the follower head 61 engages a stop 74 on the casing section 42, and this deflection of said diaphragm 45 rocks the arm 65 about the pin 67 and moves the pointed end 69 of said arm to a position in front of the scale 70 opposite the legend "Load," thereby indicating to an observer that a brake application is in effect and that the braking force applied to the brake shoes is that required to brake a fully loaded car.

Now let it be assumed that the car is empty when the brake cylinder piston 6 is displaced in the direction of the right hand by fluid under pressure supplied to the chamber 7. At the same time, fluid under pressure will be supplied to the chamber 47 through the pipe 55 to move the diaphragm follower 57 in the direction of the right hand the same as when the car is fully loaded. With the car empty the same pressure of fluid will be provided in the brake cylinder compensating pressure chamber 8 and in chamber 49 in the fluid motor 41 as in the pressure chamber 7, and while this will have no effect upon the position of the brake cylinder piston, said pressure acting in chamber 49 on diaphragm 46 will deflect said diaphragm and move follower 58 in the direction of the left hand to a position in which the pressure of spring 72 is increased sufficiently to stop such movement. This movement of follower 58 will move pin 67 and its connection with the intermediate portion of arm 65 in the direction of the left hand. This movement of the arm 65 together with the change in position of the upper end of said arm effected by the deflection of the diaphragm 45, will bring the pointed end 69 thereof to a position in front of the scale 70 opposite the legend "Empty" on said scale.

The characteristics of spring 72 may be such as to permit diaphragm 46 to assume positions, between the positions it assumes for a fully loaded car and an empty car, corresponding to the pressure of fluid provided in the brake cylinder compensating chamber 8 and hence in chamber 49, and therefore corresponding to the degree of load on the car, due to which, the pointed end 69 of arm 65 will assume corresponding positions between the legends "Empty" and "Load" to indicate to an observer that the braking force on the car is in accord with the loaded condition thereof.

When fluid under pressure is released from the brake cylinder chamber 7 to effect a release of brakes, the brake cylinder compensating chamber 8 and diaphragm chambers 47 and 49 will also be vented, if not already vented. The brake cylinder piston 6 will be returned to its brake release position by spring 9 and springs 71 and 72 will return the diaphragms 45 and 46 and their respective followers 57 and 58 to their normal positions, in which they are shown in Fig. 2 of the drawing. With the diaphragm followers 57 and 58 thus returned to their normal positions, the pointed end 69 of arm 65 will be positioned in front of the scale 70 opposite the legend "Release" to indicate the released condition of the brake apparatus.

It will now be seen that the pointed end 69 of the arm 65 will assume a position with respect to the scale 70 corresponding to the operation of the brake cylinder device that is, to indicate whether the brakes are released or applied, and if applied, to indicate the type of brake application, that is whether for an empty car, a fully loaded car, or a partially loaded car.

*Summary*

It will now be seen that I have provided an indicating mechanism for load compensating brake apparatus embodying means for indicating whether a brake application is in effect or not and, if so, whether the braking force provided is that required for an empty car, a partially loaded car or a fully loaded car.

Having now described my invention, what I claim as new and desire to secure by Letters Patent, is:

1. In combination, a load compensating fluid pressure brake cylinder device, a pivoted indicating arm, for indicating the degree of braking provided by said cylinder, mechanism comprising a mechanical linkage operatively connecting said arm to said cylinder device for effecting rocking of said arm through a chosen angle in response to operation of said cylinder device, and a fluid pressure operated means operatively connected to said arm for effecting rocking of said arm through an additional chosen angle after said arm is rocked through said first chosen angle.

2. In combination, a load compensating fluid pressure brake cylinder device comprising a piston having a pressure chamber on each side, a pivoted indicating arm for indicating the degree of braking provided by said piston, two fluid pressure responsive means each having a fluid pressure chamber at one side thereof and operatively connected with said arm, a first communication connecting one of said fluid pressure chambers with one of said pressure chambers, a second communication connecting the other of said fluid pressure chambers with the other of said pressure chambers, means for, at one time, supplying fluid under pressure only to said one pressure chamber and the connected fluid pressure chamber to rock said arm through a chosen angle, and means for, at another time, supplying fluid under pressure to all of said chambers to rock said arm through an angle greater than said chosen angle.

3. In combination, a load compensating fluid pressure brake cylinder device comprising a piston, a first pressure chamber at one side of said piston, and a second pressure chamber at the opposite side of said piston, a pivoted indicating arm for indicating the degree of braking provided by said piston, a first fluid pressure responsive means operable by fluid under pressure supplied to said first chamber to rock said arm through a chosen angle, and a second fluid pressure responsive means operable by fluid under pressure supplied to said second chamber to rock said arm through an additional angle.

4. In combination, a load compensating fluid pressure brake cylinder device comprising a piston, a pressure chamber at each side of said piston and a member movable by said piston, and an indicating mechanism for indicating the degree of braking provided by said piston comprising a lever pivoted on said cylinder with one end normally disposed in the path of movement of said movable member for operation by said member to effect rocking of said lever about its pivot, an indicating arm connected adjacent one end to the other arm of said lever, fluid pressure responsive means connected to said arm intermediate its ends and operable by fluid under pressure supplied to one of said chambers to rock said arm about its connection with said lever, and a scale graduated in terms of braking provided by said cylinder so disposed in relation to said arm that the position of said arm in relation to said scale will indicate the braking operation of said cylinder device.

5. A brake indicator device for a load compensating brake cylinder device comprising a brake cylinder piston at one side of which is the usual pressure chamber and at the opposite side of which is a second pressure chamber, said brake indicator device comprising means movable to different positions to indicate the brake operation of said piston, and means operative in accordance with the position of said piston in said brake cylinder device and the pressure of fluid or absence of fluid under pressure in said second pressure chamber for correspondingly positioning said movable means.

6. A brake indicator device for a load compensating brake cylinder device comprising a brake cylinder piston at one side of which is the usual pressure chamber and at the opposite side of which is a second pressure chamber, said brake indicator device comprising means movable to different positions to indicate the brake operation of said piston, and means operative in accordance with the pressure or absence of fluid under pressure in both of said chambers for correspondingly positioning said movable means.

7. A brake indicator device for a load compensating brake cylinder device comprising a brake cylinder piston at one side of which is the usual pressure chamber and at the opposite side of which is a second pressure chamber, said brake indicator device comprising means movable to different positions to indicate the brake operation of said piston, means adjustable according to the pressure or absence of fluid under pressure in said usual pressure chamber to effect certain adjustments of said movable means, and means responsive to fluid under pressure in said second chamber to modify the adjustment of said movable means effected by fluid under pressure in said usual pressure chamber.

ELLIS E. HEWITT.

REFERENCES CITED

The following references are of record in the file of this patent:

UNITED STATES PATENTS

| Number | Name | Date |
| --- | --- | --- |
| 715,585 | Kirchner | Dec. 9, 1902 |